Patented Dec. 4, 1928.

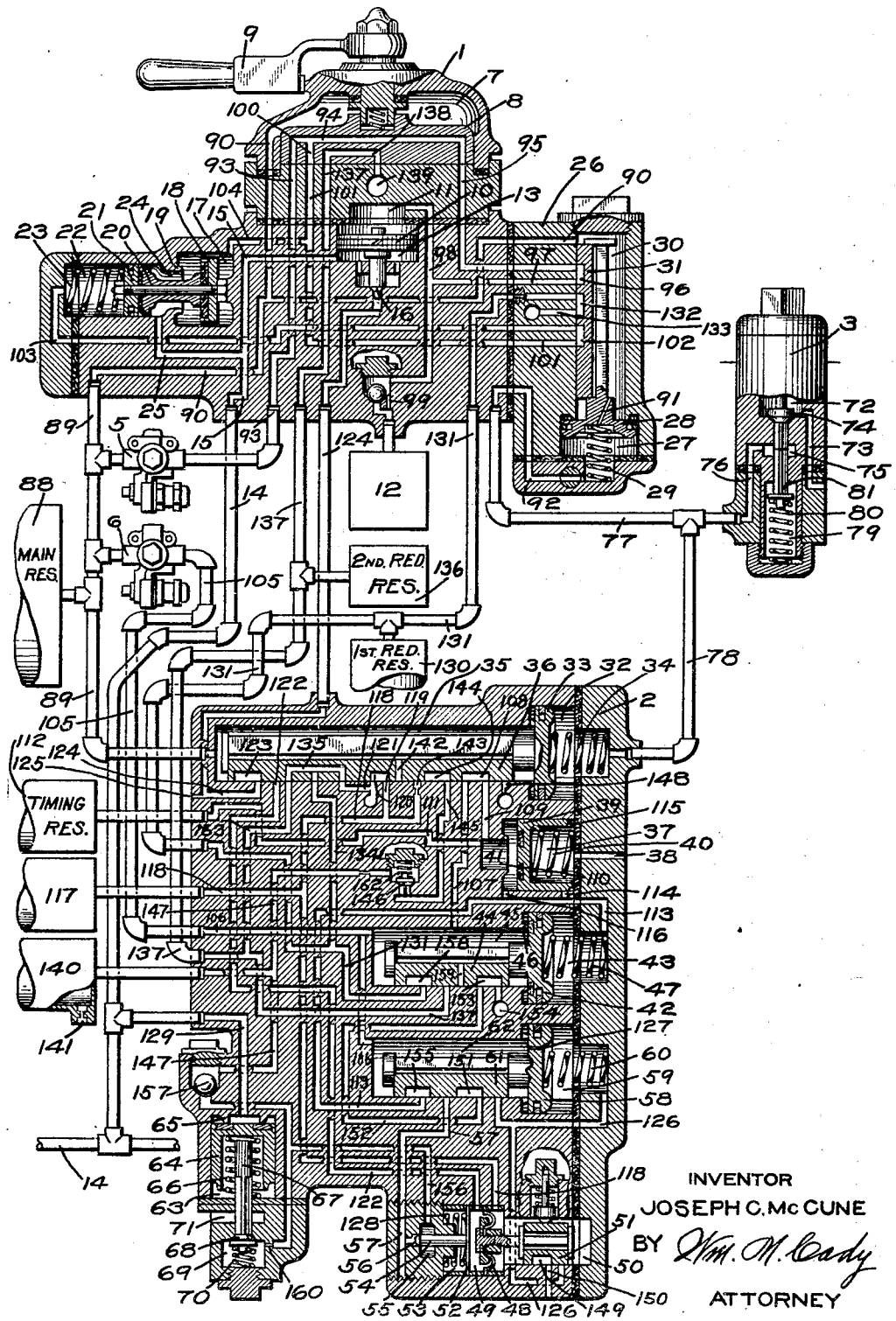

1,693,652

UNITED STATES PATENT OFFICE.

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPLIT-REDUCTION DEVICE.

Application filed June 23, 1927. Serial No. 200,858.

This invention relates to fluid pressure brakes and more particularly to train control apparatus of the type having means for automatically effecting a brake application in two stages.

It has, heretofore, been proposed to provide a train control equipment, in which the brake pipe pressure is automatically reduced in two stages, in making an application of the brakes, so as to effect an initial light brake pipe reduction, in order to lightly apply the brakes and cause the slack between the vehicles of the train to gently gather toward the front of the train and after the slack is thus gathered, said device operates to effect a second and heavier brake pipe reduction, in order to cause the desired application.

The time required for the gathering of the slack in a train varies in accordance with variations of the train length. Furthermore, brake pipe leakage and increased brake pipe pressure tends to hasten the rate of brake application, so that as a result, the time, from the start of the first to the start of the second reduction in brake pipe pressure, is not constant, but instead, varies under different train conditions.

The principal object of my invention is to provide improved means for automatically effecting a two stage reduction in brake pipe pressure, said means being adapted to automatically control the time between reductions, under the various train conditions, hereinbefore described.

Other objects and advantages will appear in the following more detailed description of my invention.

In the accompanying drawing, the single figure is a diagrammatic, sectional view of a train control equipment embodying my invention and showing the parts in their normal release positions.

As shown in the drawing, the equipment may comprise a brake valve device 1, a split or two stage reduction valve device 2, a magnet valve device 3, and two feed valve devices 5 and 6. The brake valve device 1 comprises a casing, having a chamber 7 containing the usual rotary valve 8, adapted to be operated by the handle 9, and also containing an equalizing piston 10, forming at one side a chamber 11 connected to the equalizing reservoir 12 and at the opposite side a chamber 13 connected to the usual brake pipe 14, by way of passage 15, said equalizing piston being adapted to operate a brake pipe discharge valve 16.

The brake valve device 1 also has a chamber 17, containing a cut-off valve 18, adapted to seal on a seat ring 19. The valve 18 is connected, by a stem 20, to a piston 21, contained in chamber 22 and is subject to the pressure of a coil spring 23, also contained in the chamber 22. A chamber 24 is formed between the piston 21 and valve seat 19 and is connected to the usual brake pipe 14 by way of passages 25 and 15.

Asssociated with the brake valve device, is a brake application valve portion 26, which has a piston chamber 27, containing a piston 28 and a spring 29 opposing outward movement of said piston, and a valve chamber 30, containing a slide valve 31, adapted to be operated by said piston.

The split reduction valve device 2 comprises a casing having a chamber 32, containing an application piston 33 and a spring 34, opposing outward movement of said piston, and a valve chamber 35, containing a slide valve 46, adapted to be operated by said piston. This casing also has a chamber 37, connected to the atmosphere by passage 38 and containing a timing valve piston 39, adapted to be moved, by the pressure of a spring 40, to seal on a seat ring 41. The valve piston 39 is adapted to control the operation of a hold back piston 42, contained in chamber 43, which latter piston is adapted to operate a slide valve 44, contained in a valve chamber 45. The piston 42 is adapted to seal on a seat ring 46 formed in the casing and outward movement thereof is opposed by a spring 47.

Contained in the split reduction casing, is a regulating portion, which comprises a diaphragm head 48, forming a chamber 49 at one side and a valve chamber 50 at the opposite side, said valve chamber containing a slide valve 51, adapted to be operated by the diaphragm head 48. This regulating portion also has a diaphragm head 52, which together with the diaphragm head 48 forms a chamber 49. At the opposite side of diaphragm 52 is a chamber 53, which contains a spring 128, acting on the diaphragm head. Carried and operated by the diaphragm head 52 is a stem 54, which extends through an opening in the casing wall and through a chamber 55 and has formed, at its outer end, a valve 56, which is adapted to control communication between a passage 57 and chamber 55.

The split reduction device also has a control portion, which comprises a piston 58, contained in a chamber 59 and outward movement thereof is opposed by a spring 60, and also comprises a slide valve 61, contained in a valve chamber 62 and adapted to be operated by said piston.

A chamber 63, in the split reduction valve device casing, contains a valve piston 64, adapted to be moved by the pressure of a spring 66 to seal on a seat ring 65. Upon a certain downward movement, the valve piston 64 is adapted to engage the stem 67 of a valve 68, said valve being contained in a chamber 69 and downward movement of said valve is opposed by a spring 70. The valve stem 67 extends through a wall in the casing and an atmospheric cavity 71 formed in said wall and has a fluted portion, adjacent the valve, which extends into the valve piston chamber 63, so as to maintain an atmospheric connection between the valve piston chamber 63 and cavity 71.

The magnet valve device 3 comprises a casing, containing a magnet and having a chamber 72 connected to the atmosphere by a passage 73. The chamber 72 contains a valve 74, adapted to be operated by said magnet.

The magnet valve 74 has a fluted stem extending through a wall in the casing and into a chamber 75, which chamber is connected by a passage 76 and pipes 77 and 78 to the brake valve application piston chamber 27 and the split reduction valve application piston chamber 32, respectively.

The magnet valve device casing also has a chamber 79, containing a spring 80, said spring acting on a collar formed on a fluted stem 81, which stem extends through a wall of the casing and within the cavity 75, engages the fluted stem of valve 74.

In operation, with a train in clear territory, the magnet 3 is energized and operates to seat the valve 74. Fluid under pressure is supplied from the main reservoir 88 through pipe 89 to the application valve chamber 35 of the split reduction device 2 and through pipe 89 and passage 90 to the rotary valve chamber 7 of the brake valve device and the application valve chamber 30 of the brake valve device 1. Fluid under pressure from the valve chamber 30 flows through the port 91 in the application piston 28 and into the piston chamber 27 and then through passage 92, pipe 77 and passage 76 to chamber 75 of the magnet valve device 70 and from pipe 77 through pipe 78 to the application valve piston chamber 32 of the split reduction device. Since the magnet valve 74 is held seated, pressure builds up in the application piston chambers 27 and 32, equal to the pressure of fluid in the valve chambers 30 and 35, so that the pressure of springs 29 and 34 holds the application pistons 28 and 33 in the inward or release position, as shown in the drawing.

Fluid, at the usual pressure carried in the brake pipe, is supplied by the feed valve device 5 to passage 93 in the brake valve device 1. With the brake valve device in running position, fluid at feed valve pressure from passage 93 flows to the equalizing piston chamber 11 by way of port 94 in the rotary valve 8, passage 95, cavity 96 in the application slide valve 31 and passages 97 and 98. Fluid under pressure in passage 98 flows through a choke plug 99 to the equalizing reservoir 12.

Fluid at feed valve pressure flows through port 94 in the rotary valve and port 100, passage 101, cavity 102 in the application slide valve 31 and passage 103 to the cut-off valve piston chamber 22. Fluid at feed valve pressure is also supplied from passage 101, through passage 104 to the cut-off valve chamber 17. Since the opposing fluid pressures on the piston 21 are thus equalized, the spring 23 holds the piston 21 in position with the cut-off valve unseated, as shown in the drawing, in which position, fluid at feed valve pressure from chamber 17, flows to the brake pipe 14 and to the equalizing piston chamber 13 by way of chamber 24 and passages 25 and 15.

Fluid under pressure supplied by the feed valve device 5 continues to flow as above described until the brake pipe 14, the equalizing reservoir 12 and the equalizing piston chambers 11 and 13 are charged to substantially the pressure for which the feed valve device 5 is adjusted. The discharge valve 16 is held seated in the usual manner.

Fluid, at the pressure employed for operation of the split reduction valve device 2, is supplied by the feed valve device 6, to the hold back valve chamber 45, and the control valve chamber 62 of the split reduction device 2, by way of pipe 105 and passage 106. Fluid under pressure in the hold back valve chamber 45 then flows through passage 107, cavity 108 in the application slide valve 36 and passage 109 to chamber 110 inside the timing valve seat ring 41, and from chamber 110 through passage 111 to a timing reservoir 112. At the start of charging, the timing valve 39 is seated against the seat ring 41 and the hold back piston chamber 43 is then connected to the atmosphere through passage 113, port 114, chamber 37 and passage 38.

When the pressure in chamber 110, acting on the timing valve piston 39, inside the seat ring 41, becomes sufficient to overcome the opposing pressure of spring 40, the timing valve piston 39 is shifted to the right, thereby exposing the full area of said piston to the pressure in chamber 110. The timing valve piston is then quickly moved to its outward position and effects a seal on the gasket 115 and closes the connection between port 114 and the spring chamber 37. At substantially the same time, the timing valve opens a connection from chamber 110 to the hold back piston chamber 43, by way of port 116 and passage 113, so that fluid under pressure flows from the chamber 110 to the hold back piston chamber 43, which thus becomes charged to a pressure according to the adjustment of the feed valve device 6, and since the same fluid pressure is effective in the hold back valve chamber 45, the pressure of spring 47 holds the hold back piston 42 and slide valve 44 in the position, as shown in the drawing.

With the split reduction application slide valve 36 in the inward or release position, valve chamber 50 of the regulating portion and the reservoir 117 are vented to the atmosphere through passages 118 and 119, cavity 120 in the split reduction application slide valve 36 and the atmospheric passage 121. The diaphragm chamber 49 of the regulating portion is connected through passage 122 to the seat of the split reduction application slide valve 36 and is normally at atmospheric pressure, on account of having been vented through cavity 123 in said slide valve, passage 124 and the chocked passage 125, during a preceding brake application, at which time, the split reduction application slide valve 36 was in the outward or application position. The diaphragm head 48 is thus normally balanced by atmospheric pressure and is in the position shown in the drawing, in which position, the slide valve 51 laps the passage 126 from the control piston chamber 59. Fluid from the control valve chamber 62, flowing through port 127 in the hold back piston 58, thus equalizes into the piston chamber 59 and the pressure of spring 60 then holds the control piston and slide valve 61 in the position shown in the drawing.

With the split reduction application slide valve 36 in the inward or release position and diaphragm chamber 49 of the regulating portion at atmospheric pressure, spring 128 holds the diaphragm head 52 in the position shown in the drawing, in which position the valve 56 is unseated.

Fluid under pressure in the brake pipe 14 is supplied through passage 129 to the upper face of the valve piston 64. If the brake pipe pressure carried in the system is of a low degree, such as 70 lbs., the pressure of spring 66 holds the valve piston seated against the seat ring 65, but if the brake pipe pressure carried is of a higher degree, such as 110 pounds, the valve piston 64 is unseated. With said valve piston seated against the seat ring 65, the pressure of spring 70 holds the valve 68 seated, but when the valve piston 64 is in its downward position, the valve 68 is unseated.

With the application slide valves 31 and 36, of the brake valve and split reduction valve devices respectively, in the inward position, the first reduction reservoir 130 is vented to the atmosphere through pipe and passage 131, cavity 132 in the brake valve application slide valve 31 and the atmospheric passage 133, as well as by way of passages 131 and 134 in the split reduction device, cavity 135 in the split reduction application slide valve 36 and the atmospheric passage 121. The second reduction reservoir 136 is vented to the atmosphere by way of pipe and passage 137, cavity 138 in the rotary valve 8 of the brake valve device 1, and the atmospheric passage 139, as well as by way of passages 137 and 163 in the split reduction device, cavity 135 in the split reduction application slide valve 36 and the atmospheric passage 121. The connection of the first and second reduction reservoirs, 130 and 136 respectively, to the atmosphere, by way of cavity 135 in the split reduction application slide valve 36 and the atmospheric vent 121, is not required for the operation of the train control equipment, as hereinafter fully described, and the reason for said connection will be set forth in another application.

The reservoir 140 is in constant communication with the atmosphere through a choked port 141.

If a train enters territory governed by an unfavorable signal indication, the magnet 3 becomes deenergized and the pressure of spring 80 unseats the valve 74 and connects the chamber 75 to the atmosphere, through chamber 72 and passage 73. Since the brake valve application piston chamber 27 and the split reduction valve application piston chamber 32 are both connected to chamber 75 of the magnet valve device, said piston chambers are also vented to the atmosphere and the application pistons 28 and 33 and slide valves 31 and 36 of the brake valve and split reduction valve devices, respectively, are shifted to their outward or application positions, by the fluid under pressure in the valve chambers 30 and 35, respectively.

In the application position of the brake valve application slide valve 31, the cut-off valve piston chamber 22 is connected to the atmosphere through passage 103, cavity 132 in the slide valve 31 and the atmospheric passage 133, so that the fluid at feed valve pressure in chamber 24 and cut-off valve chamber 17 acts to shift the cut-off valve 18 and piston 21 outwardly, against the pressure of spring 23, until the valve 18 seals on the seat ring 19 and prevents further flow of fluid under pressure to the brake pipe. At substantially the same time, cavity 96 in the brake valve application slide valve 31 connects the equalizing reservoir 12 and the equalizing piston chamber 11, to the first reduction reservoir 130, by way of passages 98, 97, and 131. In the application position of the application slide valve 36 of the split reduction device 2, the passage 134 from the first reduction reservoir 130 is lapped, so that the fluid in the equalizing reservoir is permitted to equalize into the first reduction reservoir, causing a predetermined pressure decrease in the equalizing piston chamber 11. The higher brake pipe pressure in the equalizing piston chamber 13, then operates to open the discharge valve 16 and permit the flow of fluid under pressure from the brake pipe 14 into passage 124 and then to the atmosphere through the choked passage 125 in the split reduction device. The flow area of choked passage 125 is less than the rate of flow from the brake pipe past the open discharge valve 16, so that a pressure is built up in passage 124.

In application position of the split reduction application slide valve 36, cavity 123 connects the brake pipe discharge passage 124 to passage 122, leading to chamber 49 of the regulating portion, so that the brake pipe discharge pressure in passage 124 is effective on one side of both of the diaphragm heads 48 and 52.

Port 142, through the split reduction application slide valve 36, registers with the choked passage 143, so that fluid under pressure is permitted to flow at a certain rate from the valve chamber 35, to the valve chamber 50 of the regulating portion and to a volume reservoir 117, by way of the choked passage 143 and passage 118.

Fluid at feed valve pressure, from the hold back valve chamber 45, is supplied to the reservoir 140 by way of passage 107, cavity 144 in the application slide valve 36, passage 145, past the check valve 146, which is opposed in opening by the pressure of a spring 162, and then through the choked passage 147. The choked atmospheric port 141, connecting the reservoir 140 to the atmosphere, is of such a size that the flow of fluid under pressure therethrough is less than the rate of supply to said reservoir, so that a pressure is permitted to gradually build up in the reservoir 140.

At the same time as the above action is taking place, the fluid under pressure in the hold-back piston chamber 43, chamber 110 and in the timing reservoir 112, is being vented to the atmosphere through passage 109, cavity 108, in the split reduction application slide valve 36, and the choked atmospheric passage 148.

If the brake pipe 14 on the train is substantially air tight, the equalizing piston 10 operates to lift the discharge valve 16 at substantially the same time or immediately following the start of decrease in the pressure in the equalizing piston chamber 11, which occurs as hereinbefore described, so that the discharged fluid from the brake pipe 14 builds up a pressure in passages 124 and 122 and in the diaphragm chamber 49 of the regulating portion, at a faster rate than a pressure is built up in the valve chamber 50 of the regulating portion and the connected reservoir 117, by the flow from the application valve chamber 36 through choked passage 143 and passage 118. As a result, the diaphragm head 48 operates to shift slide valve 51 to the right, until the cavity 149 connects passage 126, from the control piston chamber 59, to the atmosphere, through passage 150. The control piston chamber being thus vented, the pressure in the valve chamber 62 shifts the control piston 58 and slide valve 61 to the outward position, against the opposing pressure of spring 60.

In the outward position of the control slide valve 61, cavity 151 connects the control piston chamber 59 to the atmosphere, in addition to the atmospheric connection through the regulating portion, by way of passages 126, and 152, cavity 153 in the hold back slide valve 44 and the atmospheric passage 154. Cavity 155, in the control slide valve 61, connects passage 113, from the hold back piston chamber 43 and the timing reservoir 112, to passage 57. Fluid under pressure discharged from the brake pipe 14 into chamber 49 of the regulating portion, acts on diaphragm 52 to hold the valve 56 seated, so as to prevent the flow of fluid under pressure from passage 57 to the chamber 55.

When the brake pipe pressure is decreased to a degree slightly less than the predetermined degree of first reduction in the equalizing reservoir pressure, the equalizing piston 10 of the brake valve device 1, operates in the usual manner to seat the discharge valve 16 and thus prevent further flow of fluid under pressure from the brake pipe into passage 124. The pressure of the fluid in the diaphragm chamber 49 of the regulating portion, then gradually reduces through the atmospheric choke 125 by way of passages 122 and 124, until the reduced pressure in chamber 49 becomes insufficient to resist the opposing pressure of fluid in the valve chamber 50 of the regulating portion, so that the diaphragm head 48 and slide valve 51 are shifted to the left and passage 126 is again lapped. Since the control piston chamber 59 is still connected to the atmosphere, through the atmospheric passage 154, controlled by the hold back slide valve 44, the flow of fluid through port 127 in the control piston 58 can not cause said piston to move back to its inward position.

When the pressure in diaphragm chamber 49 is reduced to a certain predetermined degree, the pressure of spring 128 shifts the diaphragm 52, which unseats the valve 56, thereby permitting the flow of fluid under pressure from passage 57, from the hold back piston chamber 43 and the timing reservoir 112, to the reservoir 140, by way of chamber 55, passage 156, past the ball check valve 157 and through passage 147. The reservoir 140 is already charged to a certain degree of pressure, by means hereinbefore described, and by the connection of this reservoir with the reservoir 112, the rate of decrease in timing reservoir pressure is accelerated.

When the timing reservoir pressure, acting on the hold back piston 42 and on the timing valve piston 39, in thus reduced to a predetermined degree, the pressure of spring 40 shifts the timing valve 39 inwardly, until it seals on the seat ring 41 and connects the hold back piston chamber 43 to the atmosphere through passage 113, port 114, chamber 37 and passage 38. The fluid pressure in the hold back piston chamber 43 is thus quickly reduced and the pressure in the valve chamber 45 then shifts the hold back piston 42 and slide valve 44 to the outward position, in which position cavity 158 in the slide valve connects passage 131 from the first reduction reservoir 130 to passage 137 from the second reduction reservoir 136.

Fluid at the reduced pressure of the first reduction, then flows from the equalizing reservoir 12 and first reduction reservoir 130 to the second reduction reservoir 136, thereby causing the equalizing piston 10 to operate the discharge valve 16 in the same manner as hereinbefore described, so as to cause a second reduction in brake pipe pressure and consequently a second application of the brakes.

The operator may limit the degree of second reduction, to that required for making a full application of the brakes, by moving the brake valve handle 9 to lap position, in which position the passage 137, from the second reduction reservoir 136, is lapped by the rotary valve 8. Under such a condition, the degree of reduction will be limited to the equalization of the pressure in the equalizing reservoir 12 and first reduction reservoir 130, into the second reduction reservoir 136. If the brake valve is not lapped, a complete venting of fluid under pressure from the equalizing piston chamber 11 will occur, with the obvious result, of a complete venting of fluid from the brake pipe.

In the second reduction position of the hold back slide valve 44, port 159 registers with passage 152 and fluid at feed valve pressure from the hold back valve chamber flows to the control piston chamber 59, which added to the flow of fluid under pressure through port 127 in the control piston, quickly builds up sufficient pressure in said chamber, to shift the control valve back to its normal inward position, in which position the supply of fluid is cut off from the hold back valve chamber 45 and the pressure is then maintained in the piston chamber 59 by flow of fluid under pressure through the port 127.

When the second reduction is thus made, the pressure, in valve chamber 50 of the regulating portion, is such as to prevent the brake pipe discharge pressure in the diaphragm chamber 49 from operating the diaphragm head 48 and slide valve 51 to again vent the control piston chamber, so that after functioning as hereinbefore described, the control piston 58 remains in the inward position.

If, instead of having a substantially air tight brake pipe, there is leakage of fluid under pressure from the brake pipe to the atmosphere, then in effecting a brake application, said leakage hastens the rate of drop in brake pipe pressure and applies the brakes at a faster rate, with the obvious result, that the slack between the cars in a train is gathered more quickly and therefore the second reduction in brake pipe pressure may be started sooner. Furthermore, as the degree of brake pipe leakage increases, the time, that the usual brake pipe discharge valve remains open, to effect a certain reduction in brake pipe pressure, decreases in proportion.

According to my invention, the valve 56, when open, provides a second vent from the timing reservoir 112, said vent being auxiliary to the atmospheric vent 148, controlled by the split reduction application slide valve 36. Since the valve 56 is controlled by the fluid vented from the bracket pipe, due to its action on the diaphragm 52, the time, from the start of the first reduction, to the opening of said valve, decreases as the brake pipe leakage increases.

When the valve 56 opens, fluid under pressure in the timing reservoir 112 is permitted to flow to the reservoir 140, which is charged to a pressure, the degree of which varies as the time from the start of the first reduction to the opening of the valve 56 varies. As this time element decreases with the increase in brake pipe leakage, the pressure obtained in reservoir 140 is lower, and the consequent rate of flow from the timing reservoir 112, to the reservoir 140, increases proportionately. This means of increasing the rate of drop in the pressure of the fluid in the timing reservoir, as the brake pipe leakage increases, provides in effect, a choke, having a variable flow area, which flow area automatically is adjusted in accordance to the requirement of the particular brake pipe condition.

This variable decrease of the timing reservoir pressure in combination with the variable time from the start of the first reduction to the opening of the valve 56, provides a time element between the start of the first reduction and the start of the second reduction, which ensures the start of the second reduction substantially as soon as the train slack is completely gathered, irrespective of the brake pipe leakage condition, within a predetermined maximum limit.

If the brake pipe leakage exceeds a certain degree, the brake pipe discharge valve 16 is not opened for a considerable period of time, on account of the brake pipe leakage causing a decrease in brake pipe pressure substantially as fast as the pressure in the equalizing piston chamber 11 is reduced. Under such a condition, the pressure obtained in valve chamber 50 of the regulating portion, by the time the discharge valve 16 opens, is sufficient to hold the diaphragm head 48 and slide valve 51 in the position shown on the drawing, against the build up of fluid under pressure discharged from the brake pipe into diaphragm chamber 49. Therefore, the control piston 58 and slide valve 61 are not operated to connect the timing reservoir 112 to the valve 56 and as a result, the pressure of the timing reservoir fluid is reduced, by venting, only through the atmospheric passage 148, to the operating pressure of the timing valve 39, which then operates, in the same manner as hereinbefore described, to cause the second reduction in brake pipe pressure.

The time required to reduce the pressure of the timing reservoir fluid through the atmospheric passage 148, to the operating pressure of the timing valve 39, is the maximum time permitted to the start of the second reduction in order to apply the brakes before the train slack, that was gathered by the first reduction, can run out. If the slack should run out before effecting the second reduction, a rough and dangerous braking action could result in the same manner as if no first reduction had been made. It is important to note, that in case of failure to function of the regulating portion, from any cause, such as in case the brake valve discharge valve 16 leaks so severely as to hold the valve 56 seated, or in case the discharge valve 16 remains open longer than desired, due to a feed back of fluid into the brake pipe from the auxiliary reservoirs on the cars, or in case the control piston 58 and slide valve 61 fail to move to their outward position, when they should, that the maximum time limit for the blow down of the pressure in the timing reservoir 112 will govern and ensure the start of the second reduction.

The amount of fluid under pressure that has to be vented from the brake pipe in order to effect a certain brake pipe reduction varies as the train length varies. Therefore, as the train length is decreased, the valve 56, of the regulating portion of the split reduction device 2, will open sooner than for a long train. Opening of valve 56 permits the venting of timing reservoir fluid into the reservoir 140, which is charged to a lower pressure than if the train were longer. The timing reservoir pressure will therefore reduce at a faster rate than if the reservoir 140 were charged to a higher pressure, as would be the case with a longer train, with the result, that the time limit from the start of the first to the start of the second stage of reduction in brake pipe pressure will vary substantially in direct proportion to the train length.

It will be noted from the above description that the split reduction apparatus operates to decrease the time to the start of the second reduction, as the train length is decreased, in a manner substantially the same as said time limit is decreased by an increase in brake pipe leakage, on a train of a given length, as has been hereinbefore fully described.

If the fluid under pressure carried in the brake pipe 14 is higher than the usual 70 pounds, such as has been hereinbefore mentioned, said fluid pressure acting on the top of the valve piston 64, inside the seal ring 65, forces said valve piston to its downward position against the pressure of spring 66, thereby unseating the valve 68 and opening communication between valve chamber 69 and the atmospheric cavity 71.

In effecting the first stage of a split reduction, when carrying a high brake pipe pressure, the brake pipe discharge pressure builds up in the diaphragm chamber 49 of the regulating portion, to a higher degree, than when 70 pounds brake pipe pressure is carried, so that after the brake pipe discharge valve 16 closes, it requires a longer time, for the pressure in chamber 49 to reduce to the pressure at which the valve 56 opens. To compensate for this increased time from the start of the first reduction to the opening of the valve 56, the fluid under pressure in the timing reservoir 112 is reduced at a faster rate, after the opening of valve 56, by connecting the timing reservoir 112 to the atmosphere through passage 156, choke plug 160, valve chamber 69 past the unseated valve 68 and to the atmospheric cavity 71, in addition to the usual venting into the reservoir 140 and to the atmosphere through the choked atmospheric passage 148. This increased rate of blow down of timing reservoir pressure provides a time period from the start of the first to the start of the second reduction, under the higher brake pipe pressure conditions, which is sufficient to ensure the start of the second reduction substantially as soon as the slack in the train has been completely gathered.

The brake pipe pressure, that is required to shift the valve piston 64 downward, is greater than the pressure at which the spring 66 can return the valve to the seat ring 65, on account of the larger exposed area of the valve piston in the downward position. This is so designed to ensure, that the valve piston 64 will not move upwardly and permit the valve 68 to seat when a full service reduction in brake pipe pressure is effected.

The ball check valve 157 separates the choke plug 160 from the reservoir 140, so that when the valve 68 is unseated the choke plug 160 can not influence the charging rate of the reservoir 140 during the first stage of a split reduction, prior to the opening of valve 56.

The choke plug 141 in the reservoir 140 provides a means for venting said reservoir and the connected passages, when the split reduction apparatus is moved to release position. Furthermore, since such an atmospheric vent obviously retards the charging rate of the reservoir 140, it provides in combination with a small reservoir, the equivalent of a large reservoir. It is not necessary that this particular construction be used, since a larger reservoir might equally well be employed, so far as function is concerned, and then instead of providing an atmospheric vent from the reservoir, the venting of fluid under pressure from said reservoir could be controlled through a cavity in the split reduction application slide valve 36.

Associating the check valve 146 and spring 162 with the choke in passage 147, provides a means for controlling the rate of flow of fluid under pressure to the reservoir 140. The spring 162, acting on the check valve 146, reduces the pressure in the spring chamber, a degree below the pressure in passage 145, equal to the pressure of spring 162. At this reduced pressure, less fluid flows through the choke in passage 147, than if the pressure were higher, so that, as a result, the flow area through the choke can be made a more practical size, for the capacity required therethrough.

It will be noted, that the first reduction reservoir 130 and the second reduction reservoir 136 are separated, until the split reduction device operates to connect said reservoirs. This ensures limiting the degree of the first reduction to the predetermined amount permissible for gentle gathering of the train slack.

It will further be noted, that the second reduction can not start until intended, since the start of said reduction is governed by reducing the pressure of the timing reservoir fluid to a certain predetermined degree.

Having now described my invention, what I claim as new and desire to secure by Letters Patent, is:—

1. In a fluid pressure brake, the combination with a brake pipe, of means for automatically effecting successive reductions in brake pipe pressure, and means for regulating the time elapsing between said reductions in accordance with the brake pipe pressure carried.

2. In a fluid pressure brake, the combination with a brake pipe, of two reduction reservoirs, means operated upon a venting of fluid under pressure to one of said reservoirs to effect a reduction in brake pipe pressure and to the other of said reservoirs to effect a second reduction in brake pipe pressure, and means whereby the connection of one reservoir with the other is timed in accordance with the brake pipe pressure carried.

3. In a fluid pressure brake, the combination with a brake pipe, of means for automatically effecting successive reductions in brake pipe pressure including a first reduction reservoir, a second reduction reservoir, a valve device for connecting said reservoirs, a timing reservoir normally charged with fluid under pressure, and a valve device for controlling the first mentioned valve device and subject to the opposing pressures of the timing reservoir and a spring in effecting a reduction in brake pipe pressure.

4. In a fluid pressure brake, the combination with a brake pipe, of means for automatically effecting successive reductions in brake pipe pressure including a first reduction reservoir, a second reduction reservoir, a valve device for connecting said reservoirs, a timing reservoir, a valve device associated with the first mentioned valve device and subject to the timing reservoir pressure for maintaining the first mentioned valve inoperative, and means for gradually reducing said pressure to permit the first mentioned valve device to operate to connect said first and second reduction reservoirs.

5. In a fluid pressure brake, the combination with a brake pipe, of means for automatically effecting successive reductions in brake pipe pressure including a first reduction reservoir, a second reduction reservoir, a valve device for connecting said reservoirs and having a valve chamber and a piston chamber, a timing reservoir, a timing valve device having a piston valve chamber, said timing reservoir and chambers being normally connected and charged with fluid under substantially the same pressure, and means whereby the start of the first reduction will cause said piston chamber to be disconnected from said timing reservoir and the other of said chambers and will vent these latter chambers to the atmosphere, and means whereby a predetermined drop of the pressure in said timing reservoir piston valve chamber and piston chamber will cause said piston valve to disconnect the piston chamber and piston valve chamber and to connect said piston chamber to the atmosphere to vent the fluid under pressure in said piston chamber to permit said valve device to operate to connect said first and second reduction reservoirs.

6. In a fluid pressure brake, the combination with a brake pipe, of an equalizing reservoir, a valve mechanism subject to the opposing pressures of the equalizing reservoir and the brake pipe for venting fluid from the brake pipe, a first and a second reduction reservoir, means for first connecting the first reduction reservoir to said equalizing reservoir, a control valve device having a control portion and a regulating portion, a timing reservoir, another reservoir, a valve device for controlling the operation of said regulating portion to permit said control portion to operate to connect said timing reservoir and last mentioned reservoir to further reduce the pressure in said timing reservoir and means operable upon the reduction in timing reservoir pressure for connecting said first and second reduction reservoirs to effect a second reduction in brake pipe pressure.

7. In a fluid pressure brake, the combination with a brake pipe, of two reduction reservoirs, means for first venting fluid under pressure to one of said reservoirs to effect a reduction in brake pipe pressure and then to the other of said reduction reservoirs to effect a second reduction in brake pipe pressure, and means for causing an elapse of time from the beginning of the first reduction to the beginning of the second reduction, said means comprising a timing reservoir initially charged with fluid under pressure and means operable upon a reduction in timing reservoir pressure for effecting the second reduction.

8. In a fluid pressure brake, the combination with a brake pipe, of two reduction reservoirs, means whereby fluid under pressure is vented to one of said reservoirs to cause an initial reduction in brake pipe pressure, a timing reservoir initially charged with fluid under pressure, a timing valve device maintained in one position by the timing reservoir pressure, a reservoir initially out of communication with said timing reservoir, means operable upon the start of the initial reduction in brake pipe pressure for causing the last mentioned reservoir and timing reservoir to be connected to cause a reduction in the pressure acting upon said timing valve device whereby said valve device will move from its initial position, and means controlled by said timing valve device for connecting said reduction reservoirs to effect a second reduction in brake pipe pressure.

9. In a fluid pressure brake, the combination with a brake pipe, of two reduction reservoirs, means whereby fluid under pressure is vented to one of said reservoirs to cause an initial reduction in brake pipe pressure, a timing reservoir initially charged with fluid under pressure, a timing valve device maintained in one position by the timing reservoir pressure, a reservoir initially out of communication with said timing reservoir, means operable upon the start of the initial reduction in brake pipe pressure for causing the last mentioned reservoir and timing reservoir to be connected to cause a reduction in the pressure acting upon said timing valve device whereby said valve device will move from its initial position, means controlled by said timing valve device for connecting said reduction reservoirs to effect a second reduction in brake pipe pressure, and means whereby said timing reservoir and the reservoir connected with it, are disconnected when the second reduction in brake pipe pressure is initiated.

10. In a fluid pressure brake, the combination with a brake pipe, of two reduction reservoirs, means whereby fluid under pressure is vented to one of said reservoirs to cause an initial reduction in brake pipe pressure, a timing valve device having a chamber initially charged with fluid under pressure, a timing valve piston adapted to be maintained in one position by the fluid under pressure in said chamber, a reservoir, means operable upon the start of the initial reduction in brake pipe pressure for gradually reducing the pressure in said chamber, valve means operable by the vented fluid under pressure from the brake pipe for causing a connection to be made between said chamber and valve means for a predetermined period of time, at the end of which period of time said valve means is adapted to connect said chamber and last mentioned reservoir to cause an increased reduction of the pressure in said chamber to permit said timing valve piston to move to another position, and means operable upon the operation of said timing valve piston for connecting said reduction reservoirs for initiating a second reduction in brake pipe pressure.

11. In a fluid pressure brake, the combination with a brake pipe, of two reduction reservoirs, means whereby fluid under pressure is vented to one of said reservoirs to cause an initial reduction in brake pipe pressure, a timing valve device having a chamber initially charged with fluid under pressure, a timing valve piston adapted to be maintained in one position by the fluid under pressure in said chamber, a hold back piston device having a valve chamber initially charged, a reservoir, an application piston device operable to cause the start of the initial reduction in brake pipe pressure and to connect said chamber and last mentioned reservoir, means for regulating the rate of flow of the fluid under pressure to said reservoir, said application piston device also connecting said timing valve device chamber to the atmosphere, means for regulating the flow of fluid from the last mentioned chamber, and means operable upon the initial reduction in brake pipe pressure for connecting said timing valve device chamber and the last mentioned reservoir for effecting a reduction in the pressure in the timing valve device chamber to permit said timing valve piston to operate and permit said hold back piston device to operate to connect said reduction reservoirs to effect a second reduction in brake pipe pressure.

12. In a fluid pressure brake, the combination with a brake pipe and means for effecting a reduction in brake pipe pressure, of a normally charged timing reservoir means operated upon a predetermined reduction in pressure in said timing reservoir for effecting a second reduction in brake pipe pressure, and means controlled by the fluid discharge from the brake pipe in effecting the first reduction in brake pipe pressure for controlling the rate at which fluid is vented from the timing reservoir.

13. In a fluid pressure brake, the combination with a brake pipe and means for effecting a reduction in brake pipe pressure, of a normally charged timing reservoir means operated upon a predetermined reduction in pressure in said timing reservoir for effecting a second reduction in brake pipe pressure, a reservoir normally at atmospheric pressure, means for charging said reservoir with fluid under pressure at a predetermined rate, and means controlled by fluid vented from the brake pipe for controlling communication from the timing reservoir to the other reservoir.

14. In a fluid pressure brake, the combination with a brake pipe and means for effecting a first reduction in brake pipe pressure, of a timing reservoir normally charged with fluid under pressure, means operated upon a predetermined reduction in pressure in said reservoir for effecting a second reduction in brake pipe pressure, means for reducing the pressure in said reservoir, and means controlled by the degree of brake pipe pressure carried for controlling the connection from said reservoir to a vent port.

15. In a fluid pressure brake, the combination with a brake pipe and means for effecting a first reduction in brake pipe pressure, of a timing reservoir normally charged with fluid under pressure, means operated upon a predetermined reduction in pressure in said reservoir for effecting a second reduction in brake pipe pressure, means for reducing the pressure in said reservoir, and means operated upon an increase in the brake pipe pressure carried in the system for opening a communication through which fluid is vented from said reservoir.

16. In a fluid pressure brake, the combination with a brake pipe and means for effecting a first reduction in brake pipe pressure, of a timing reservoir normally charged with fluid under pressure, means operated upon a predetermined reduction in pressure in said reservoir for effecting a second reduction in brake pipe pressure, means for venting fluid from said reservoir, means for controlling an additional venting of fluid from said reservoir, and means subject to the opposing pressure of fluid discharged from the brake pipe and a pressure which increases at a predetermined rate for controlling the operation of said means for controlling an additional vent.

17. In a fluid pressure brake, the combination with a brake pipe, of means for automatically effecting successive reductions in brake pipe pressure, and means whereby the time period elapsing between said reduction will be automatically varied to suit a high or a low brake pipe pressure.

18. In a fluid pressure brake, the combination with a brake pipe, of means for automatically effecting successive reductions in brake pipe pressure, and means whereby the time period elapsing between the start of the first reduction and the start of the second reduction will be automatically regulated to suit high or low brake pipe pressures.

19. In a fluid pressure brake, the combination with a brake pipe, of means for automatically effecting successive reductions in brake pipe pressure, and means whereby the time period elapsing between the start of the first reduction and the start of the second reduction will be regulated to suit varying brake pipe pressures.

20. In a fluid pressure brake, the combination with a brake pipe, of means for automatically effecting successive reductions in brake pipe pressure, timing means for regulating the time period elapsing between the start of one reduction and the start of another reduction under low brake pipe pressure, and timing means adapted to cooperate with the first mentioned timing means for timing said reductions under high brake pipe pressures.

21. In a fluid pressure brake, the combination with a brake pipe, of means for automatically effecting successive reductions in brake pipe pressure, timing means for regulating the time period elapsing between the start of one reduction and the start of another reduction under low brake pipe pressure, and timing means adapted to cooperate with the first mentioned timing means for timing said reductions under high brake pipe pressures, the last mentioned timing means being inoperative under low brake pipe pressure.

22. In a fluid pressure brake, the combination with a brake pipe, of means for effecting a first reduction in brake pipe pressure, of a timing reservoir normally charged with fluid under pressure, a reservoir partially charged with fluid under pressure during the first reduction in brake pipe pressure, a control valve device having said reservoirs communicating therewith and normally maintaining said reservoirs disconnected from each other, a regulating valve device through which said partially charged reservoir normally communicates with said control valve device, means in said regulating valve device subject to the pressure of fluid discharged from said brake pipe for causing communication to be established between said timing reservoir and said regulating valve device, and for causing communication of said partially charged reservoir and said control valve to be closed, and means for venting the fluid under pressure from said regulating valve device at a predetermined rate to vent said timing reservoir into said partially charged reservoir for causing a second reduction in brake pipe pressure to be initiated.

23. In a fluid pressure brake, the method of effecting successive reductions in brake pipe pressure consisting of, first operating an application mechanism to start an initial reduction in brake pipe pressure and at substantially the same time to vent fluid under pressure in a timing valve device at a regulated rate, to permit vented fluid under pressure from the brake pipe to flow to a regulating valve device and further to gradually charge a reservoir, fluid under pressure from the brake pipe then builds up a pressure in the regulating valve device and operates it to cause the operation of a control valve device, the pressure in said regulating valve device is then gradually reduced permitting said device to operate to vent fluid under pressure in said timing valve device to said reservoir, and then operating said timing valve device to cause the connection of a plurality of reduction reservoirs to effect a further reduction in brake pipe pressure.

24. In a fluid pressure brake, the combination with a brake pipe, of means for effecting an initial reduction in brake pipe pressure, a timing reservoir normally charged with fluid under pressure, means operated upon a predetermined reduction in pressure in said timing reservoir for effecting a further reduction in brake pipe pressure, a valve device for controlling the venting of fluid from said reservoir, and means operating upon a change in the signal indication for effecting the operation of said valve device.

25. In a fluid pressure brake, the combination with a brake pipe, of means for effecting an initial reduction in brake pipe pressure, a timing reservoir normally charged with fluid under pressure, a valve device operated upon a predetermined reduction in pressure in said timing reservoir for effecting a further reduction in brake pipe pressure, a valve device for controlling a vent from said reservoir, and means controlled by the pressure of fluid discharged from the brake pipe for controlling the operation of the last named valve device.

26. In a fluid pressure brake, the combination with a brake pipe, of means for automatically effecting a first and a second reduction in brake pipe pressure, means operable upon the start of the first reduction, for causing a predetermined maximum time period to elapse before the start of the second reduction regardless of brake pipe leakage, and means controlled by the brake pipe pressure carried, for shortening the intervening time period between said brake pipe reductions.

27. In a fluid pressure brake, the combination with a brake pipe, of means for automatically effecting a first and a second reduction in brake pipe pressure, means operable upon the start of the first reduction for causing a predetermined maximum time period to elapse before the start of the second reduction, regardless of brake pipe leakage, and means operable by fluid discharged from said brake pipe, in effecting the first reduction, for shortening said time period between reductions.

28. In a fluid pressure brake, the combination with a brake pipe, and means for effecting a reduction in brake pipe pressure, of a normally charged timing reservoir, and means operated upon a predetermined reduction in pressure in said reservoir for effecting a second reduction in brake pipe pressure, said means being adapted to cause a predetermined maximum time period to elapse between the start of the first reduction and the start of the second reduction regardless of brake pipe leakage.

29. In a fluid pressure brake, the combination with a brake pipe, of means for automatically effecting successive reductions in brake pipe pressure including a discharge valve device operable to effect an initial brake pipe reduction over a period of time governed by the degree of brake pipe leakage, and means subject to the pressure of fluid discharged from said brake pipe for governing the time period between said initial reduction and a second reduction.

30. In a fluid pressure brake, the combination with a brake pipe, of means for automatically effecting successive reductions in brake pipe pressure including a brake pipe discharge valve device adapted to discharge fluid under pressure from said brake pipe for a period of time proportionate to the degree of brake pipe leakage, and means subject to the pressure of fluid discharged from said brake pipe for controlling the time period elapsing between said reductions.

31. In a fluid pressure brake, the combination with a brake pipe, of means for automatically effecting successive reductions in brake pipe pressure including means for discharging fluid under pressure from said brake pipe to effect an initial reduction in brake pipe pressure over a period of time governed by the degree of brake pipe leakage, and means subject to the pressure of fluid discharged from said brake pipe during said period of time for controlling the time of the start of another reduction.

In testimony whereof I have hereunto set my hand.

JOSEPH C. McCUNE.